US007689875B2

(12) United States Patent
Cahill et al.

(10) Patent No.: US 7,689,875 B2
(45) Date of Patent: Mar. 30, 2010

(54) WATCHDOG TIMER USING A HIGH PRECISION EVENT TIMER

(75) Inventors: Jeremy Paul Cahill, Seattle, WA (US); Eric Frank Nelson, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 698 days.

(21) Appl. No.: 10/133,555

(22) Filed: Apr. 25, 2002

(65) Prior Publication Data

US 2003/0204792 A1 Oct. 30, 2003

(51) Int. Cl.
*G06F 11/00* (2006.01)

(52) U.S. Cl. ............................ 714/55; 714/23; 714/25; 714/51

(58) Field of Classification Search .................. 714/23, 714/25, 51, 55, 56
See application file for complete search history.

(56) References Cited

U.S. PATENT DOCUMENTS 5,233,613 A * 8/1993 Allen et al. .................. 714/55
5,367,668 A * 11/1994 Pandolfo ..................... 714/12
5,437,042 A * 7/1995 Culley et al. .................. 710/28
5,526,486 A * 6/1996 Moloney et al. .............. 714/49
6,141,774 A * 10/2000 Mattheis ...................... 714/27
6,266,781 B1 * 7/2001 Chung et al. ................... 714/4
6,363,496 B1 * 3/2002 Kwiat ........................... 714/4
6,647,511 B1 * 11/2003 Swoboda et al. .............. 714/30
6,934,883 B2 * 8/2005 Kim et al. ..................... 714/25
7,480,837 B2 * 1/2009 Martin et al. ................. 714/55
2002/0038401 A1 * 3/2002 Zaidi et al. .................. 710/305
2002/0046362 A1 * 4/2002 Bolz ........................... 714/23
2002/0083375 A1 * 6/2002 Indo ............................ 714/51
2002/0129303 A1 * 9/2002 Karppanen .................. 714/43
2002/0184571 A1 * 12/2002 Dean et al. .................... 714/43
2003/0037172 A1 * 2/2003 Lacombe et al. ............ 709/310
2003/0204792 A1 * 10/2003 Cahill et al. .................. 714/55

OTHER PUBLICATIONS

Michael B. Jones, et al.; "Results from a Latency Study of Windows NT Or The Problems You're Having May Not Be The Problems You Think You're Having"; 1998; 4 pages.

(Continued)

*Primary Examiner*—Emerson C Puente
(74) *Attorney, Agent, or Firm*—Wolf, Greenfield & Sacks, P.C.

(57) ABSTRACT

A system and method for detecting and handling errors in a computer system are disclosed. The invention is configurable to permit selecting of timelength or time out values, assigned interrupts to be generated and error recover procedures so that failures of system events can be promptly detected and recovered from. The watchdog timer is started with a timelength or time out value and generates an interrupt (i.e., is triggered) if the period of time set as the timelength passes without receiving a reset. The watchdog timer interface interacts and controls the hardware based timer to obtain this watchdog timer functionality. The hardware based timer is generally a high precision timer that exists in hardware architecture for a computer system and is usable by system software. The watchdog timer interface controls and sets various parameters and/or registers of the hardware based timer in order to provide the desired functionality of a watchdog timer. Thus, another software component can call and interact with the watchdog timer interface for a system event and view the watchdog timer interface as a watchdog timer (i.e., the operation of the hardware based timer is transparent).

25 Claims, 10 Drawing Sheets

OTHER PUBLICATIONS

Chunhao "Joseph" Lee, et al.; "PC Based Control of Robotic and Mechatronic Systems Under MS-Windows NT Workstation"; 1999; pp. 1-34.

Intel; "IA-PC Multimedia Timers"; Draft Specifications; Jun. 2000, Revision 0.97; p. 1-36.

* cited by examiner

WATCHDOG TIMER USING A HIGH PRECISION EVENT TIMER

TECHNICAL FIELD

The present invention relates generally to facilitating detection and handling of system failures, and more particularly to systems and methods utilizing an existing hardware timer as a watchdog timer to detect and handle system failures.

BACKGROUND OF THE INVENTION

A watchdog timer is a standard mechanism employed to detect and respond to system failures in a timely manner. The watchdog timer reacts to a failure by executing a specific routine after the expiration of a set time period, unless it is reset by software. A watchdog timer is typically utilized to handle situations in which a computer locks up, halts, hangs or is in an infinite loop. A watchdog timer is started or initialized with a time out value. Then, the time out value of the watchdog timer is decremented at a certain frequency by a decrement value until the timer reaches zero, indicating that an error has occurred. During normal operation, a watchdog timer is reset, typically at regular intervals, prior to reaching zero. On being reset, the watchdog timer is reinitialized or reset to the time out value. However, if the timer is not reset prior to reaching zero, the watchdog timer is triggered indicating that an error has occurred. Generally, a recovery procedure is then initiated to recover from the error.

Watchdog timers are typically employed in computer systems to detect errors and/or assist in recovering from errors. For example, a watchdog timer can be employed to detect and recover from application errors. If an application locks, halts, or is otherwise non-responsive, the timer will not be reset, which will consequently cause a previously set period of time to expire and a response to be triggered. Typical examples of watchdog-initiated responses include an interrupt, a warm boot (system reset), or a system shutdown.

Watchdog timers utilized in computer systems are often implemented as a separate retriggerable hardware timer attached to a processor's reset line. These hardware based watchdog timers are typically integrated into computer systems on Peripheral Component Interconnect (PCI) or Integrated Standard Architecture (ISA) cards connected through their respective slots on the motherboard, or alternatively, made to operate outside the computer by way of an external serial device. These timers are connected to a computer's reset line and initiate a reboot when the timer is triggered (i.e., counts down to zero). Although this approach enables recovery from system lock-ups, it can result in complete system reset, which typically involves a significant delay in waiting for the system to reboot. Generally, these hardware based watchdog timers are unable to interact with an operating system thereby limiting their applications to computer systems.

Another approach to employing watchdog timers in computer systems is to utilize conventional system timers to implement watchdog timers. However, these system timers require a relatively large amount of time to program and operate and utilize significant system resources. Additionally, these system timers generally are only accessible via I/O registers, which is inefficient for accessing and programming the timers. Also, these system timers are often utilized for existing applications and are, thus, unable to be employed by software components such as the operating system or applications.

Another shortcoming of conventional watchdog timers is that they have limited time out values. For example, 32 bit based watchdog timers operating at typical system bus speeds are limited to time out values of about seven minutes. Such a limitation renders these watchdog timers unusable for applications requiting longer time out values, such as when booting a series of large servers many of which require an hour or more to boot.

Thus, watchdog timers can be effective in detecting and recovering from errors encountered in computer systems. However, conventional watchdog timers are either too expensive or require significant system resources. Specifically, hardware based watchdog timers are costly and can be limited in recovery procedures, yet standard system timers require too many system resources.

SUMMARY OF THE INVENTION

The following is a summary of the invention in order to provide a basic understanding of some aspects of the invention. This summary is not intended to identify key/critical elements of the invention or to delineate the scope of the invention. Its sole purpose is to present some concepts of the invention in a simplified form as a prelude to the more detailed description that is presented later.

The present invention relates generally to systems and methods that facilitate detecting and handling errors in a computer system, and, more specifically to utilizing a hardware based timer as a watchdog timer via an application programming interface (API) referred to as a watchdog timer interface to detect and handle errors for system events. The invention is highly configurable to permit selecting of timelength or time out values, assigned interrupts to be generated and error recover procedures so that failures of system events can be promptly detected and recovered from. The watchdog timer is initiated with a timelength or time out value and generates an interrupt (e.g., is triggered) if the period of time set as the timelength expires without receiving a reset. The watchdog timer interface interacts and controls the hardware based timer to obtain this watchdog timer functionality. The hardware based timer is generally a high precision timer that pre-exists in hardware architecture for a computer system and is usable by system software. The watchdog timer interface controls and sets various parameters and/or registers of the hardware based timer in order to provide the desired functionality of a watchdog timer. Thus, another software component can call and interact with the watchdog timer interface for a system event and view the watchdog timer interface as a watchdog timer (e.g., the operation of the hardware based timer is transparent).

Thus, as can readily be appreciated from the foregoing discussion as well as the subject specification, the present invention leverages pre-existing hardware timers to provide the highly desired functionality of a watchdog timer. Furthermore, the invention can improve system reliability by being configurable to detect a wider range of system errors or failures than conventional watchdog timers. Additionally, the invention is configurable to selectively handle system failures, unlike conventional watchdog timers, and thus permits greater control over recover procedures.

In accordance with one particular aspect of the invention, a watchdog timer system is provided that provides watchdog timer functionality. The system includes a hardware timer and a watchdog timer interface. The hardware timer periodically increments a counter value towards a compare value and generates an interrupt on the compare value being equal to the counter value. The watchdog timer interface controls the hardware timer according to received parameters.

In accordance with another particular aspect of the invention a method of operating a hardware timer as a watchdog timer is provided. A compare value of the hardware timer is set to a computed value, the computed value being a function of a desired time out of a system event. A counter value of the hardware timer is set to an initial value, typically zero. The hardware timer is enabled and the counter value is incremented every tick period. An interrupt is generated on the compare value being equal to the counter value.

In accordance with yet another particular aspect of the invention, a method of detecting and handling errors utilizing a watchdog timer is disclosed. A time length is set for a system event. A watchdog timer system is started for the system event according to the time length, the watchdog timer system having a hardware timer controlled by a watchdog timer interface. The watchdog timer system is reset during successful processing of the event. The watchdog timer system is stopped or halted on successful processing to the system event. An interrupt is generated on the timer expiring (i.e., the time length elapsing).

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

DETAILED DESCRIPTION OF THE INVENTION

Figure 1:
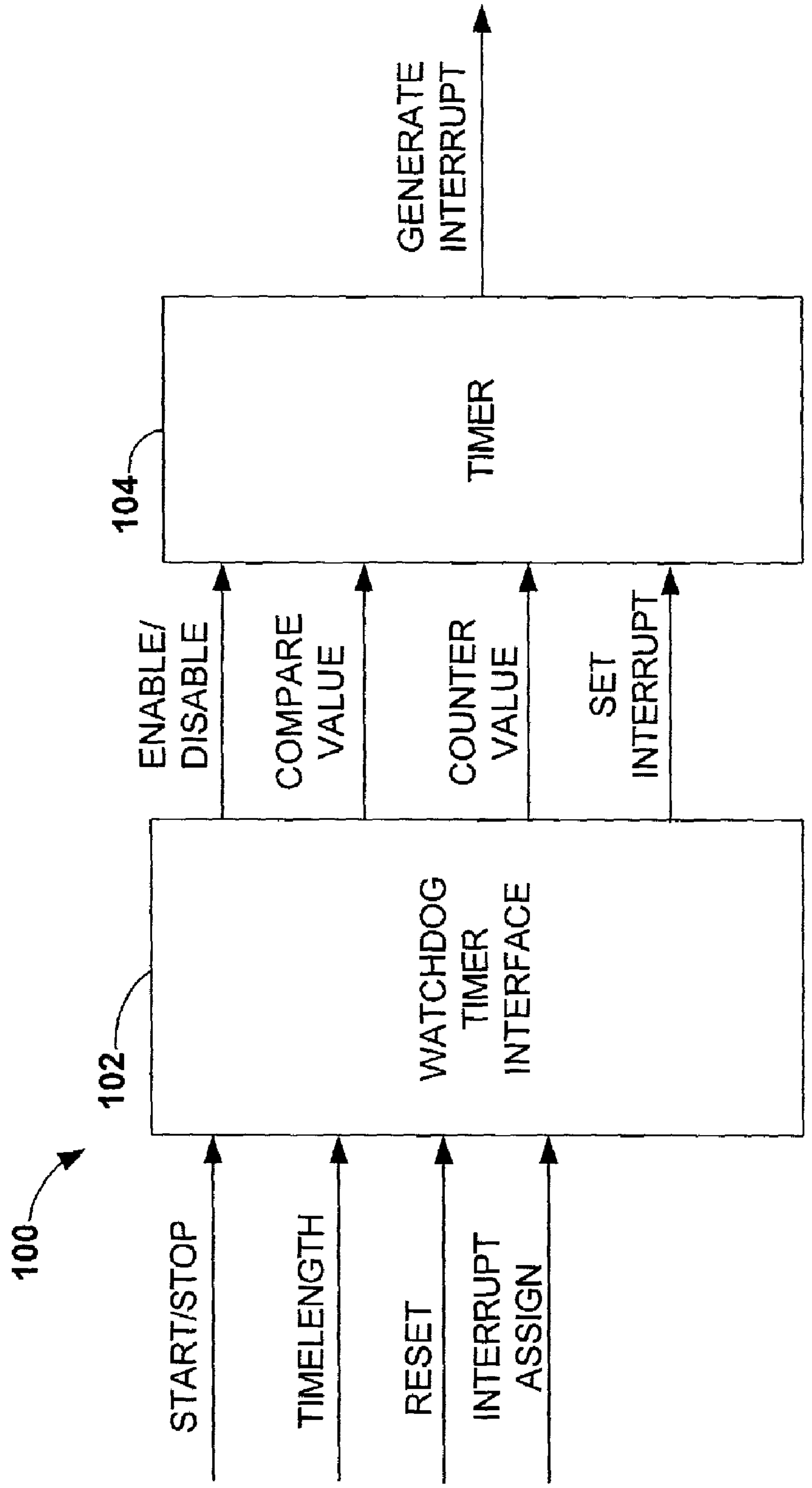
FIG. 1 is a block diagram illustrating a watchdog timer system according to an aspect of the invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

It is to be appreciated that, for purposes of the present invention, any or all of the functionality associated with modules, systems and/or components discussed herein can be achieved in any of a variety of ways (e.g. combination or individual implementations of active server pages (ASPs), common gateway interfaces (CGIs), application programming interfaces (API's), structured query language (SQL), component object model (COM), distributed COM (DCOM), system object model (SOM), distributed SOM (DSOM), ActiveX, common object request broker architecture (CORBA), database management systems (DBMSs), relational database management systems (RDBMSs), object-oriented database management system (ODBMSs), object-relational database management systems (ORDBMS), remote method invocation (RMI), C, C++, practical extraction and reporting language (PERL), applets, HTML, dynamic HTML, server side includes (SSIs), extensible markup language (XML), portable document format (PDF), wireless markup language (WML), standard generalized markup language (SGML), handheld device markup language (HDML), graphics interchange format (GIF), joint photographic experts group (JPEG), binary large object (BLOB), other script or executable components).

The present invention relates generally to systems and methods that facilitate detecting and handling errors in a computer system, and, more specifically in accordance with one aspect of the invention to utilizing a hardware based timer as a watchdog timer via an application programming interface (API) referred to as a watchdog timer interface to detect and handle errors for system events. The invention is configurable to permit selecting of timelength or time out values, assigned interrupts to be generated and error recover procedures so that failures of system events can be promptly detected and recovered from. The watchdog timer is started with a timelength or time out value and generates an interrupt (e.g., is triggered) if the period of time set as the timelength expires without receiving a reset. The watchdog timer interface interacts and controls the hardware based timer to obtain this watchdog timer functionality. The hardware based timer is generally a high precision timer that pre-exists in hardware architecture for a computer system and is usable by system software. The watchdog timer interface controls and sets various parameters and/or registers of the hardware based timer in order to provide the desired functionality of a watchdog timer. Thus, another software component can call and interact with the watchdog timer interface for a system event and view the watchdog timer interface as a watchdog timer (i.e., the operation of the hardware based timer is transparent).

FIG. 1 is a block diagram illustrating a watchdog timer system 100 according to an aspect of the invention. The system 100 can be employed by an operating system component, kernel mode application, user mode application and the like to detect and recover from errors. The system 100 includes a watchdog timer interface 102 and a timer 104, the timer 104 being controlled and configured via the watchdog timer interface 102. The system 100 is operable to receive a start/stop parameter, a timelength parameter, a reset parameter and an interrupt assign parameter and to trigger an interrupt (i.e., typically the assigned interrupt). The system 100 is enabled or started by the start/stop parameter and triggers the interrupt when a length of time, specified by the timelength parameter, passes or expires without the reset parameter being received.

The timer 104 is a hardware timer and operates as an "up counter". The timer 104 is typically a 32 or 64 bit counter, is aperiodic or configured to be aperiodic and can be pre-existing to a computer system (i.e., an existing multimedia timer or high precision event timer (HPET)). However, it is appreciated that a timer acting as a "down counter" can be utilized and still be in accordance with the present invention. Additionally, it is appreciated that other suitable bit sizes (e.g., 24 bits, 72 bits, 128 bits . . . ), instead of 32 or 64 bits, and periodic timers can also be utilized and still be in accordance with the present invention. The timer 104 is operable via a number of timer parameters including, enable/disable, a compare value, a counter value, a set interrupt and an interrupt enable parameters. The timer 104 generally operates and is enabled by the following: the compare value is set, the counter value is set, the set interrupt parameter is set to a desired interrupt, the interrupt enable parameter is set to "true", the timer 104 is enabled by setting the enable/disable parameter to "true", the counter value is incrementally updated (by one) every tick period and an interrupt is generated on the compare value being substantially equal to the counter value. The compare value is set to a desired value and is generally 32 or 64 bits. The counter value is typically set to zero, however it can be set to other values, and is also 32 or 64 bits. The tick period is the period at which the counter value is incremented. Typically, the tick period is less than or equal to about 100 nanoseconds. In alternate aspects of the invention, the tick period is a settable parameter of the timer 104. Generally, the smaller the tick period is, the greater the precision of the timer 104. If the counter value is set to a number greater than the compare value, the counter value wraps around to zero before being incremented to be substantially equal to the compare value. The set interrupt parameter is set to the desired interrupt to be generated by the timer 104. Optionally, an interrupt type of the timer 104 can be set to determine whether the interrupt to be generated is edge triggered or level triggered. The timer 104 is typically disabled by setting the enable/disable parameter to "false" and by optionally setting the interrupt enable parameter to "false". The timer parameters can be implemented as registers of the timer 104.

The watchdog timer interface 102 is an application programming interface and is operative to receive interface parameters including the start/stop parameter, the timelength parameter, the reset parameter and the interrupt assign parameter and set the timer parameters of the timer 104 including the enable/disable parameter, the compare value parameter, the counter value parameter, the set interrupt parameter, and the interrupt enable parameter. Generally, the watchdog timer interface 102 controls and configures the timer 104 such that it provides the functionality of a watchdog timer. The start/stop parameter is employed to start or stop operation of the watchdog timer system 100. Typically, a "true" value of the start/stop parameter indicates "start" and a "false" value of the start/stop parameter indicates "stop". It is appreciated that other aspects of the invention can utilize other suitable signals and/or parameters to indicate starting and stopping of the watchdog timer system 100. For operation of the system 100 to be started, the timelength parameter and interrupt assign parameter should also be received. The timelength parameter is employed to set a length of time or timeout value for the system 100. Typically, the timelength parameter is in microseconds; however other units can be employed by design and/or including an optional units parameter. The reset parameter is employed to reset the watchdog timer system 100 prior to the system counting to the timelength parameter. The interrupt assign parameter is utilized to assign an interrupt to be generated on the system 100 (i.e., timer 104) being triggered. It is appreciated that alternate aspects of the invention can be implemented without the interrupt assign parameter by using a default interrupt to be generated on the system 100 being triggered.

As stated above, the watchdog timer interface 102 sets the timer parameters of the timer 104 in order to control the timer 104 and have the system 100 function as a watchdog timer. These timer parameters are generally set by the watchdog timer interface 102 on receiving the start/stop, timelength and interrupt assign parameters. Default values can be employed for the timelength and interrupt assign parameters if those particular parameters are not received. On receiving the start/stop, timelength and interrupt assign parameters, the watchdog timer interface 102 sets the interrupt enable parameter to "true", sets the counter value parameter to zero, sets the compare value to a computed value and sets the set interrupt parameter to be the interrupt assign parameter. The compare value is computed as a function of the timelength parameter. Typically, the compare value is equal to the timelength parameter divided by the tick period of the timer 104. Then, the enable/disable parameter is set to "true". On the watchdog timer interface 102 receiving the reset parameter (i.e., reset being equal to "true"), the enable/disable parameter is set to "false", the counter value is reset to zero and then the enable/disable parameter is set to "true". If the timer 104 is periodic, the watchdog timer interface 102 sets the enable/disable parameter to "false" on the interrupt being generated.

It is appreciated that the timer parameters of the timer 104 can be implemented as registers and/or bits (which are set and cleared) and mapped to memory space, typically by the basic input/output system (BIOS) and/or the operating system (OS). The BIOS and/or OS can then report the address locations for the memory mapped timer parameters therein facilitating setting of the timer parameters by the watchdog timer interface 102 and improving operation of the system 100. Additionally, other parameters of the timer 104 can be handled and/or controlled by the watchdog timer interface 102 including, but not limited to, legacy interrupt routing, size of the compare value, size of the counter value, periodic mode and the like.

The interrupt generatable by the system 100 (also referred to as an exception or trap) is essentially a signal indicating that an unscheduled event (i.e., error) has occurred. Typically, the unscheduled event (i.e., the interrupt) causes the central processing unit (CPU) to stop executing code being currently executed and to branch or jump to a special piece of code called an interrupt service routine (ISR). This unscheduled event can be user or device initiated or result from the occurrence of an error. One type of interrupt that can be utilized by the system 100 is a maskable interrupt, which the processor can temporally ignore if the processor deems it necessary to complete its current task. Another type of interrupt that can be utilized by the system 100 is a non-maskable interrupt (NMI), which conversely, can not be ignored because it is, typically, associated with high priority tasks.

Furthermore, it is appreciated that the watchdog timer interface 102 can read the timer parameters of the timer 104. Thus, the watchdog timer interface 102 can be configured, for example, to monitor the compare value and the counter value to determine how much time is left before an interrupt is generated. Additionally, the watchdog timer interface 102 can be configured, for example, to notify another component on the compare value and the counter value being substantially equal, which is useful for implementations in which generation of an interrupt is not desired or necessary.

Figure 2:
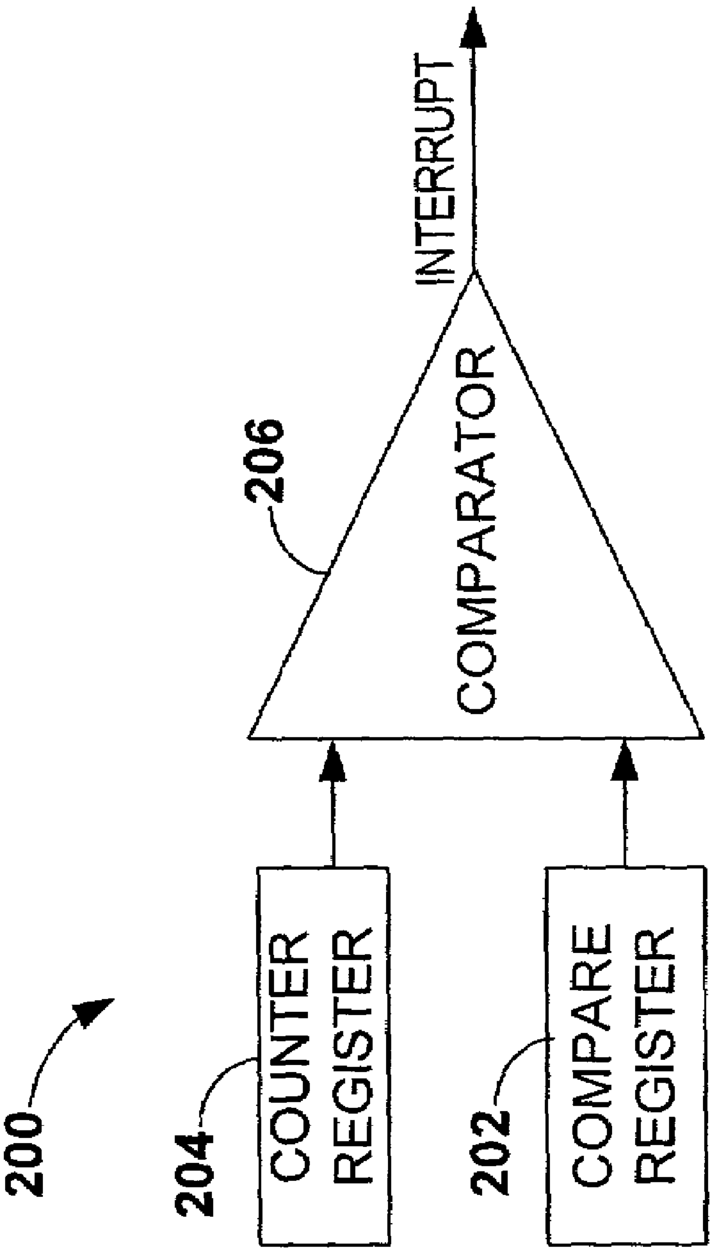
FIG. 2 is a diagram illustrating a timer in accordance with an aspect of the invention.

FIG. 2 is a diagram illustrating a timer 200 utilizable in accordance with an aspect of the invention. The timer 200 can be employed as the timer 104 in system 100 of FIG. 1. The timer 200 includes a compare register 202, a counter register 204 and a comparator 206 and operates as an aperiodic "up counter". The compare register is set with a compare value and the counter register is set with a counter value prior to enabling the timer 200. Once the timer 200 is enabled, the counter register is periodically incremented (by one) every tick period. Additionally, the value of the counter register and the compare register is compared by the comparator 206 every tick period and an interrupt is generated on the values of the counter register and the compare register being equal. Generally, the counter value is initially set to zero and the compare value is set corresponding to a desired time length. Typically, the compare value is set to be equal to the desired time length divided by the tick period, which is the period or frequency at which the counter register is incremented. Typically, the tick period is less than or equal to about 100 nanoseconds.

If the timer 200 is aperiodic, the timer 200 becomes disabled after being triggered (i.e., generating the interrupt). If the timer 200 is periodic, the initial value of the compare register, the compare value, is added to the compare register and the timer 200 continues again until the counter register once again equals the compare register and again, generates the interrupt. The above is then repeated (i.e., adding the initial value of the compare register to the current value of the compare register) until the timer 200 is disabled.

Figure 3:
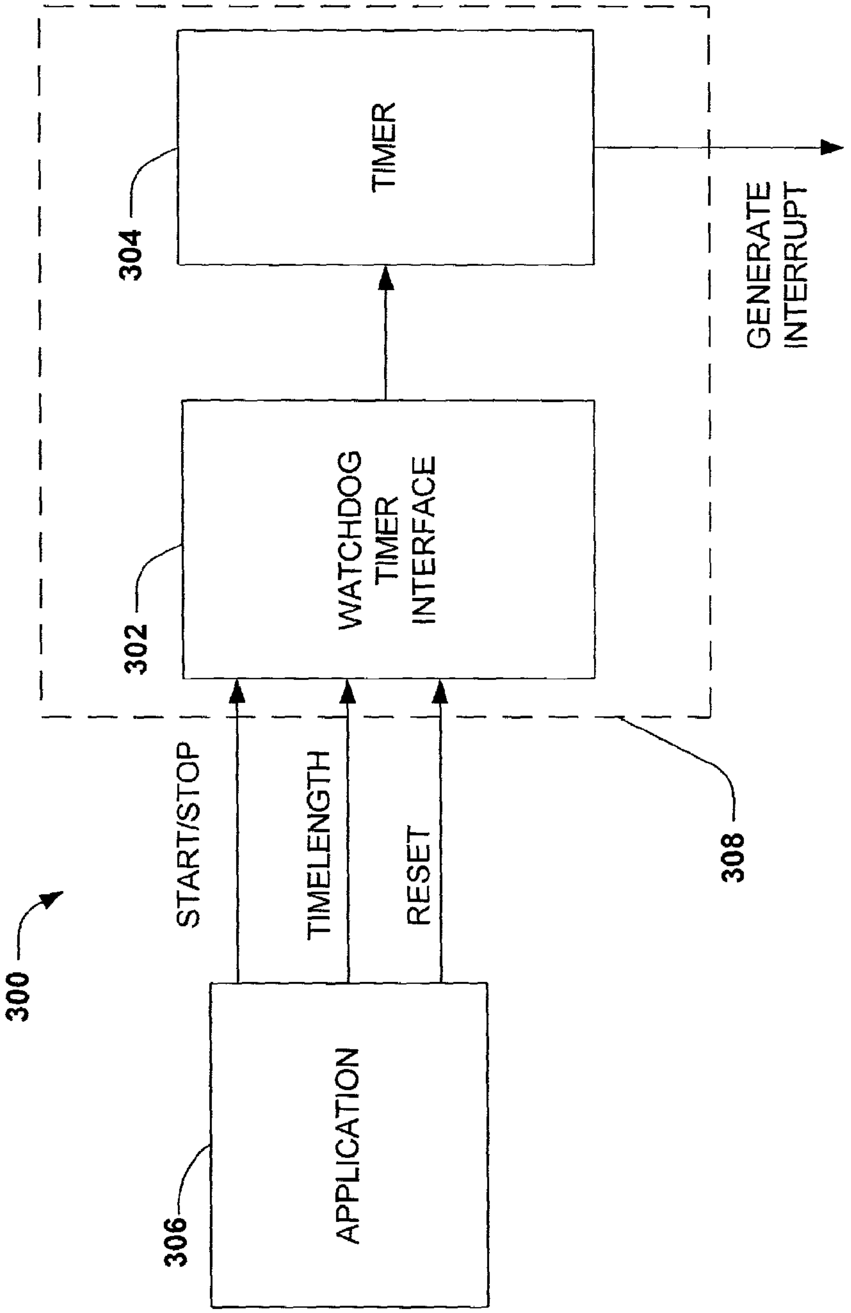
FIG. 3 is a block diagram illustrating a system according to an aspect of the invention.

FIG. 3 is a block diagram illustrating a system 300 according to an aspect of the invention. The system 300 is employed to detect and recover from errors. The system 300 includes an application 306 and a watchdog timer system 308. The watchdog timer system 308 comprises a watchdog timer interface 302 and a timer 304, the timer 304 being controlled and configured via the watchdog timer interface 302. The watchdog timer system 308 is operable to be called by the application 308 to start the watchdog timer system 308, to reset the watchdog timer system 308 and to stop the watchdog timer system 308.

The application 306 is a software component that utilized the watchdog timer system 308 to detect and recover from errors or erroneous events. The application 306 can operate in user mode, kernel mode and/or both user and kernel mode. Operating systems generally separate software components into user mode and kernel mode. User mode components have limited access to system resources and generally are only able to access user memory. Kernel mode components have greater access to system resources than user mode components and typically have access to memory (not just user memory) and devices like multimedia timers or high precision event timers through what are referred to as privileged instructions. The application 306 can be, for example, a device driver, network driver or other software component. The application 306 can include an error handling routine that executes on an error or erroneous event occurring and performs recovery operations. Additionally, an error handling routine (not shown) can be implemented separate from the application 306. The application 306 calls the watchdog timer interface 302 to detect errors and recover from errors associated with an event or system event. The application 306 determines an appropriate time out or timelength parameter based on the event.

The timer 304 is a hardware timer and operates as an "up counter". The timer 304 is generally a 32 or 64 bit counter and is aperiodic or nonperiodic. However, it is appreciated that a timer acting as a "down counter" can be utilized and still be in accordance with the present invention. Additionally, it is appreciated that other suitable bit sizes (e.g., 24 bits, 72 bits, 128 bits . . . ), instead of 32 or 64 bits, and periodic timers can also be utilized and still be in accordance with the present invention. However, the greater number of bits permits longer time out values for the timer 304. The timer 304 is operable via a number of timer parameters including, enable/disable, a compare value, a counter value, a set interrupt and an interrupt enable parameters. The timer 304 generally operates and is enabled by the following: the compare value is set, the counter value is set, the set interrupt parameter is set to a desired interrupt, the interrupt enable parameter is set to "true", the timer 304 is enabled by setting the enable/disable parameter to "true", the counter value is incrementally updated (by one) every tick period and an interrupt is generated on the compare value being substantially equal to the counter value. The compare value is set to a desired value and is generally 32 or 64 bits. The counter value is typically set to zero, however it can be set to other values, and is also 32 or 64 bits. The tick period is the period at which the counter value is incremented. Typically, the tick period is less than or equal to about 300 nanoseconds. In alternate aspects of the invention, the tick period is a settable parameter of the timer 304. Generally, the smaller the tick period is, the greater the precision of the timer 304 is. If the counter value is set to a number greater than the compare value, the counter value wraps around to zero before being incremented to be substantially equal to the compare value. The set interrupt parameter is set to the desired interrupt to be generated by the timer 304. Optionally, an interrupt type of the timer 304 can be set to determine whether the interrupt to be generated is edge triggered or level triggered. The timer 304 is typically disabled by setting the enable/disable parameter to "false" and by optionally setting the interrupt enable parameter to "false". The timer parameters can be implemented as registers of the timer 304.

The watchdog timer interface 302 is an application programming interface and is operative to be called by the application 306. However, it is appreciated that other applications and software components operating in user mode and/or kernel mode can also call the watchdog timer interface 302. A start/stop parameter is employed to start or stop operation of the watchdog timer system 308. Typically, a "true" value of the start/stop parameter indicates "start" and a "false" value of the start/stop parameter indicates "stop". It is appreciated that other aspects of the invention can utilize other suitable signals and/or parameters to indicate starting and stopping of the watchdog timer system 308. For operation of the system 308 to be started, the timelength parameter and interrupt assign parameter should also be received. The timelength parameter is employed to set a length of time or timeout value for the system 308. Typically, the timelength parameter is in micro-seconds; however other units can be employed by design and/or including an optional units parameter. An exemplary implementation of the watchdog timer interface can be as follows:

NTSTATUS

```
KeWatchdogTimer(
IN BOOLEAN Start,
IN ULONG TimeLength OPTIONAL
)
```

Where Start is “true” to enable or start the watchdog timer system 308 and TimeLength is a timeout interval. Thus, to start the system 308 with a one second timeout value or length, a call can be as follows: KeWatchDogTimer(true, 10000000). Similarly, to stop or disable the system 308 a call can be as follows: KeWatchDogTimer(false,0).

A reset call is employed to reset the watchdog timer system 308 prior to the system counting to the timelength parameter. An exemplary interface for the reset call is: KeWatchdogTimerReset( ), with no parameters. Thus, the watchdog timer system 308 can be reset by the call: KeWatchdogTimerReset( ). Typically, the reset call is made by the application 308 prior to the time out or timelength value. Optionally, an interrupt assign call can be utilized to assign an interrupt to be generated on the watchdog timer system 308 (i.e., timer 304) being triggered. An exemplary interrupt function call can be, for example: KeWatchdogTimerAssignInterrupt(ULONG interrupt). Otherwise, a default interrupt is employed as the assigned interrupt.

As stated above, the watchdog timer interface 302 sets the timer parameters of the timer 304 in order to control the timer 304 and have the system 308 function as a watchdog timer. On being called to start the watchdog timer system 308, the watchdog timer interface 302 sets the interrupt enable parameter of the timer 304 to “true”, sets the counter value parameter of the timer 304 to zero, sets the compare value of the timer 304 to a computed value and sets the set interrupt parameter to be the interrupt assign parameter. The compare value is computed as a function of the timelength. Typically, the compare value is equal to the timelength parameter divided by the tick period of the timer 304. Then, the enable/disable parameter is set to “true”. On the watchdog timer interface 302 receiving a reset call, the enable/disable parameter is set to “false”, the counter value is reset to zero and then the enable/disable parameter is set to “true”. If the timer 304 is periodic, the watchdog timer interface 302 sets the enable/disable parameter to “false” on the interrupt being generated.

It is appreciated that the timer parameters of the timer 304 can be implemented as registers and/or bits (which are set and cleared) and mapped to memory space, typically by the basic input/output system (BIOS) and/or the operating system (OS). The BIOS and/or OS can then report the address locations for the memory mapped timer parameters therein facilitating setting of the timer parameters by the watchdog timer interface 302 and improving operation of the system 300. Additionally, other parameters of the timer 304 can be handled and/or controlled by the watchdog timer interface 302 including, but not limited to, legacy interrupt routing, size of the compare value, size of the counter value, periodic mode and the like.

Figure 4:
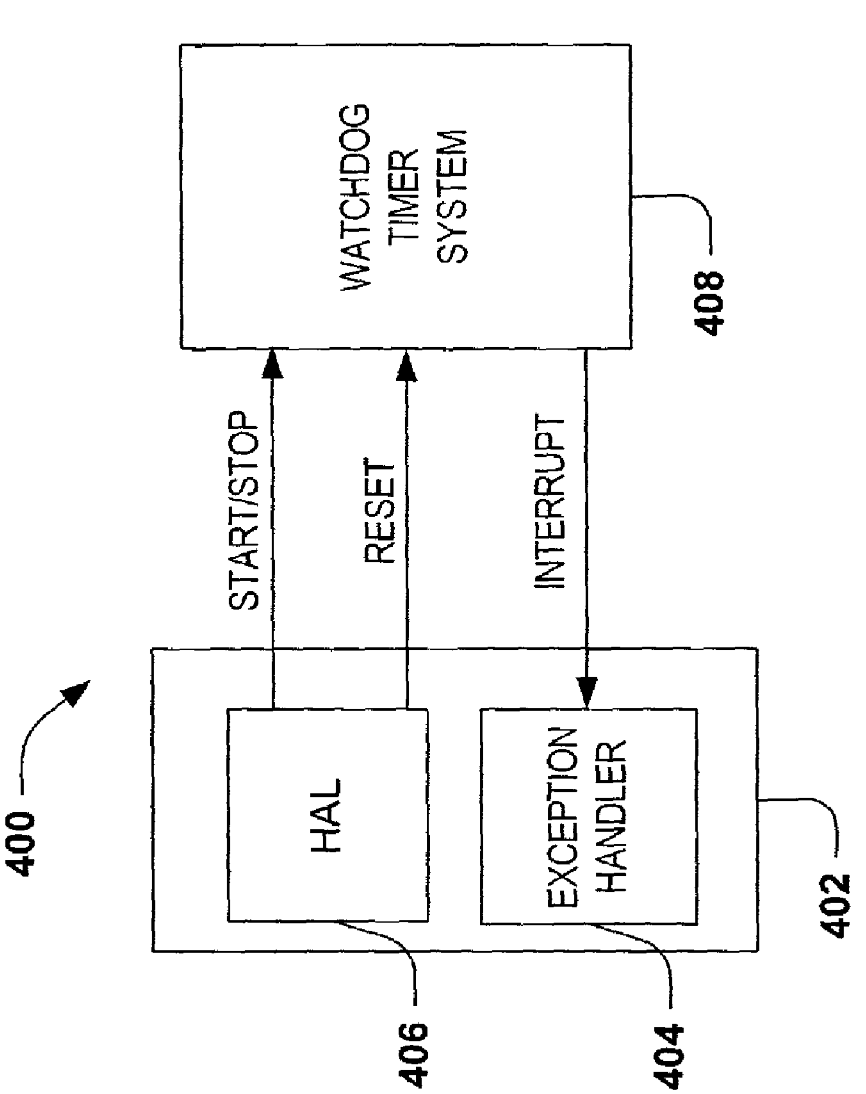
FIG. 4 is a block diagram of an error detection and handling system according to an aspect of the invention.

FIG. 4 is a block diagram of an error detection and handling system 400 utilizing a watchdog timer according to an aspect of the invention. The system 400 includes an operating system 402 that interacts with a watchdog timer system 408 and is part of a computer system. The operating system 402 includes a hardware abstraction layer (HAL) 406 and an exception handler 404.

The HAL 406 is a layer of programming that allows a computer operating system to interact with a hardware device at a general or abstract level rather than at a detailed hardware level. The HAL 406 can be called from other operating system components and/or from a device driver. The HAL 406 permits the calling program to interact with devices in a more general way than it would otherwise. The exception handler 404 handles exceptions (detected errors) and performs recover operations. The exception handler 404 is also a part of the operating system.

The watchdog timer system 408, operates as a watchdog timer and is implemented with an application programming interface (API) and a hardware based timer such as is described with respect to FIG. 1 and FIG. 3 and variations thereof. The HAL 406 calls the watchdog timer system 408 with a timelength parameter to start the watchdog timer system 408. The timelength parameter, typically in nano-seconds, is the length of time in which the HAL has to reset the watchdog timer system 408 to avoid generation of an interrupt. Then, under normal error free operation, the HAL 406 periodically resets the watchdog timer system 408 prior to the timelength parameter (i.e., timeout) so that an interrupt is not generated. If an error or erroneous event occurs, the HAL 406 fails to reset the watchdog timer system 408 prior to the watchdog timer system 408 being triggered and generating the interrupt. If the interrupt is generated, the exception handler 404 receives the interrupt and performs suitable error handling and recovery procedures. Additionally, The HAL 406 can call the watchdog timer system 408 and set a desired interrupt as the interrupt to be generated by the watchdog timer system 408. Different interrupts can be attached to different exception handling routines. Thus, a different exception handler can be selected by the HAL 406 selecting a different interrupt.

On the interrupt being generated, a central processing unit (CPU) of the computer system stops its current process and saves the current processor state by saving the current program counter and current state of the CPU registers. The CPU then employs a vector table to determine an address of the exception handler 404 which is associated with the interrupt. The CPU then branches or jumps to the address of the exception handler 404 and begins executing the code of the exception handler 404 which appropriately handles and recovers from the error or erroneous event. The exception handler 404 can simply reset the computer system. The exception handler 404 can be configured and/or programmed to handle errors in an appropriate manner.

Figure 5:
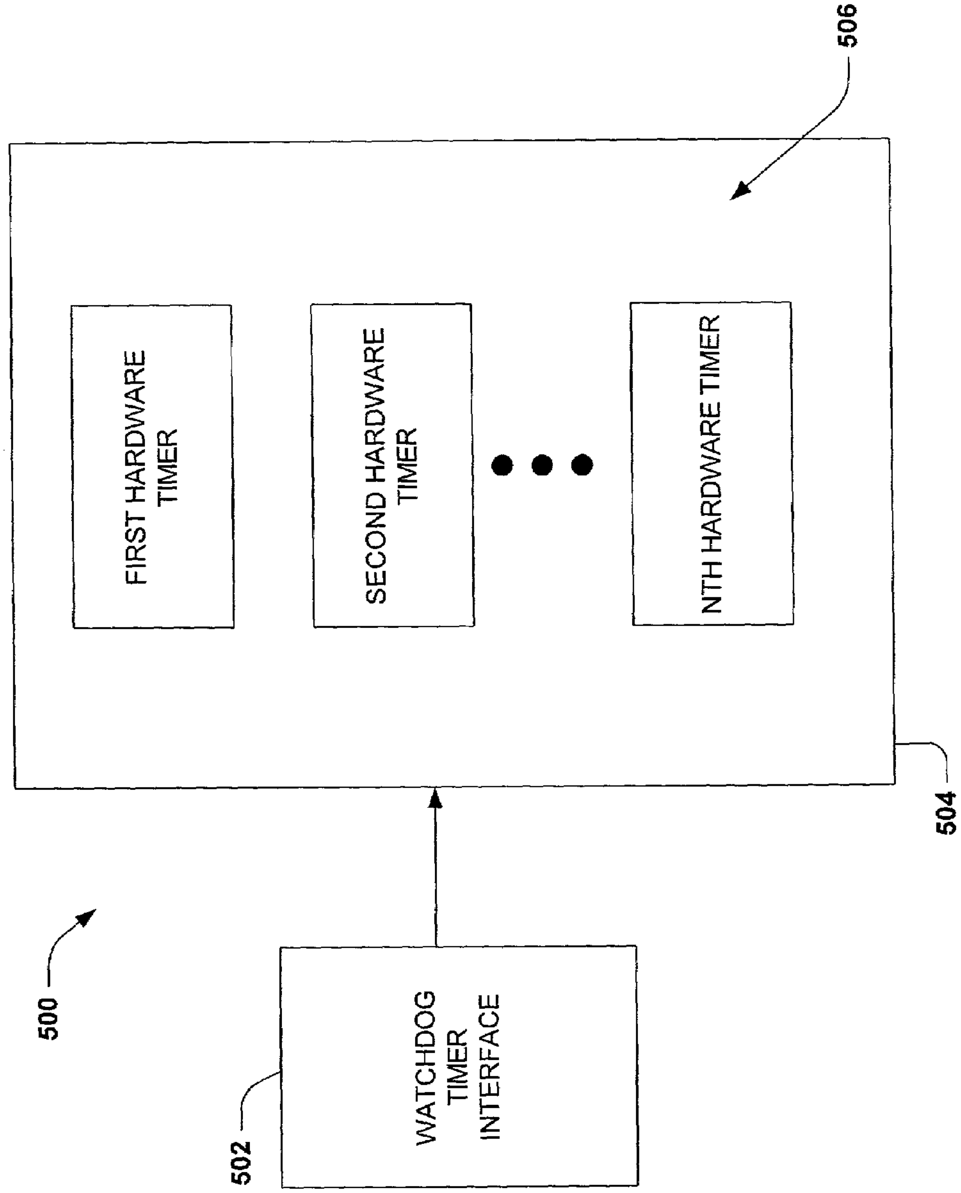
FIG. 5 is a block diagram of a computer system according to an aspect of the invention.

FIG. 5 is a block diagram of a computer system 500 according to an aspect of the invention. The system 500 includes a watchdog timer interface 502 and computer hardware architecture 504. The computer hardware architecture includes a plurality of hardware timers 506. The hardware timers 506 are accessible by kernel mode components such as the watchdog timer interface 502 and can also be referred to as multimedia timers or high precision event timers. The hardware timers 506 generally operate as an “up counter”, however the hardware timers can instead operate as a “down counter” and still be in accordance with the present invention. The hardware timers 506 are generally 32 or 64 bit counters and are aperiodic or nonperiodic. However, it is appreciated that other suitable bit sizes (e.g., 24 bits, 72 bits, 128 bits . . . ) for the hardware timers 506 can be utilized, instead of 32 or 64 bits, and still be in accordance with the present invention. Further, the hardware timers 506 can also operate as periodic timers and still be in accordance with the present invention. The hardware timers 506 are respectively operated and controlled via a number of timer parameters including, enable/disable, a compare value, a counter value, a set interrupt and an interrupt enable parameters. The hardware timers 506 generally operate and are enabled by the following: the compare value is set, the counter value is set, the set interrupt parameter is set to a desired interrupt, the interrupt enable parameter is set to “true”, enabled by setting the enable/disable parameter to "true", the counter value is incrementally updated (by one) every tick period and an interrupt is generated on the compare value being substantially equal to the counter value. The compare value is set to a desired value and the counter value is typically set to zero. The tick period is the period at which the counter value is incremented. Typically, the tick period is less than or equal to about 300 nanoseconds. In alternate aspects of the invention, the tick period is a settable parameter of the hardware timers 506. Generally, the smaller the tick period is, the greater the precision of the timers. If the counter value is set to a number greater than the compare value, the counter value wraps around to zero before being incremented to be substantially equal to the compare value. The set interrupt parameter is set to the desired interrupt to be generated by the respective timer. Optionally, an interrupt type of the timer can be set to determine whether the interrupt to be generated is edge triggered or level triggered. The hardware timers 506 are typically disabled by setting the enable/disable parameter to "false" and by optionally setting the interrupt enable parameter to "false". The timer parameters can be implemented as registers.

The watchdog timer interface 502 is an application programming interface and is operative to be called by an application (not shown). The watchdog timer interface 502 can query the architecture 504 or the plurality of timers 506 to identify an available timer. One or more of the plurality of timers 506 can be already employed by a software component and thus unavailable to the watchdog timer interface 502. Then, the available timer is controlled and/or configured by the watchdog timer interface 502. A start/stop parameter is typically received by the watchdog timer interface 502 to start or stop available timer. Typically, a "true" value of the start/stop parameter indicates "start" and a "false" value of the start/stop parameter indicates "stop". It is appreciated that other aspects of the invention can utilize other suitable signals and/or parameters to indicate starting and stopping. For operation of the available timer to be started, the timelength parameter and interrupt assign parameter should also be received. The timelength parameter is employed to set a length of time or timeout value. Typically, the timelength parameter is in micro-seconds; however other units can be employed by design and/or including an optional units parameter. A reset call is employed to functionally reset the available timer prior to the interrupt being triggered. On being called to start the watchdog timer interface 502 sets the interrupt enable parameter of the available timer to "true", sets the counter value parameter of the available timer to zero, sets the compare value of the available timer to a computed value and sets the set interrupt parameter to be the interrupt assign parameter. The compare value is computed as a function of the timelength. Typically, the compare value is equal to the timelength parameter divided by the tick period of the available timer. Then, the enable/disable parameter is set to "true". On the watchdog timer interface 502 receiving a reset call, the enable/disable parameter is set to "false", the counter value is reset to zero and then the enable/disable parameter is set to "true". If the available timer is periodic, the watchdog timer interface 502 sets the enable/disable parameter to "false" on the interrupt being generated in order to disable the available timer.

Figure 6:
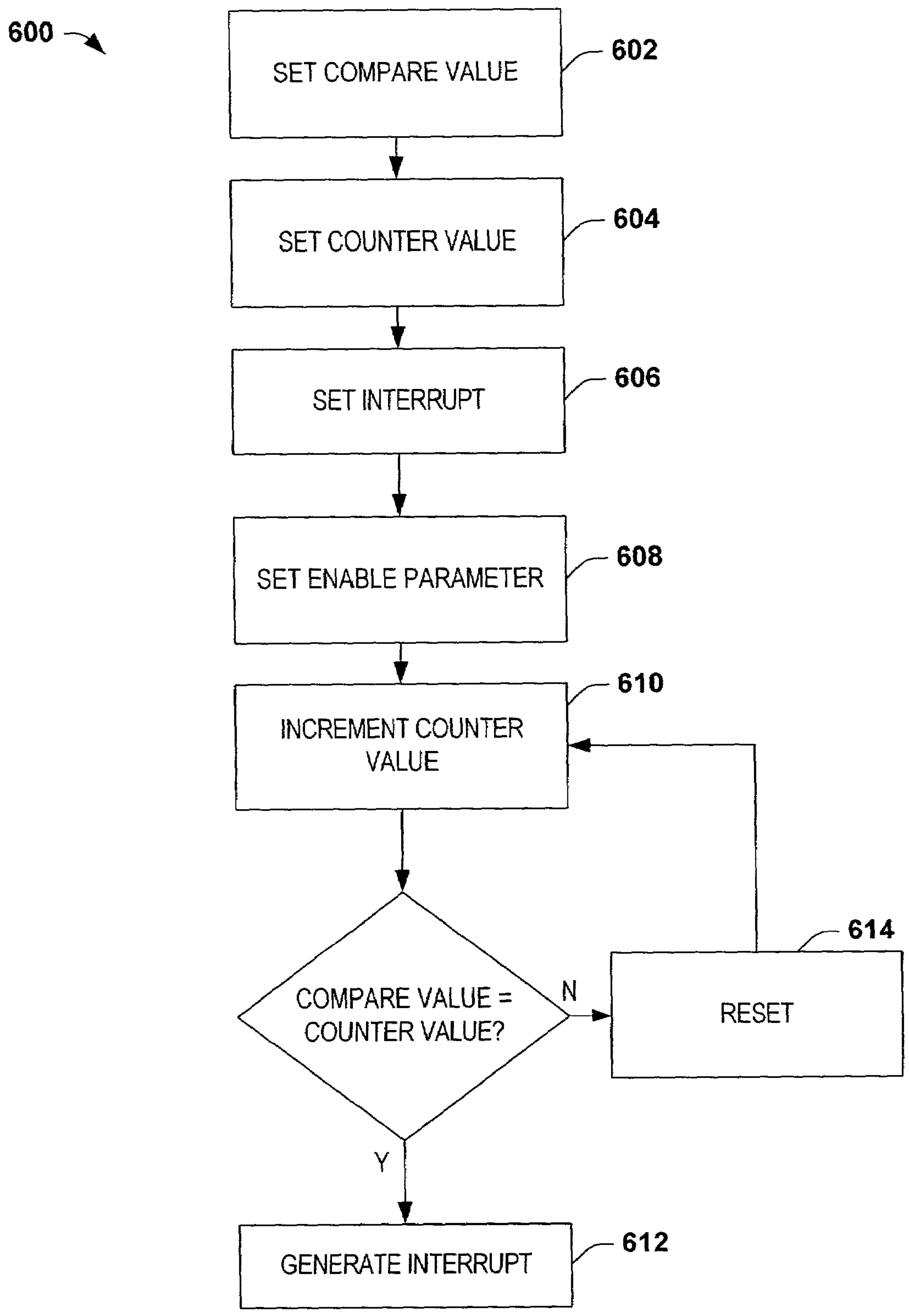
FIG. 6 is a flow diagram of a method of controlling a hardware based timer according to an aspect of the invention.
Figure 7:
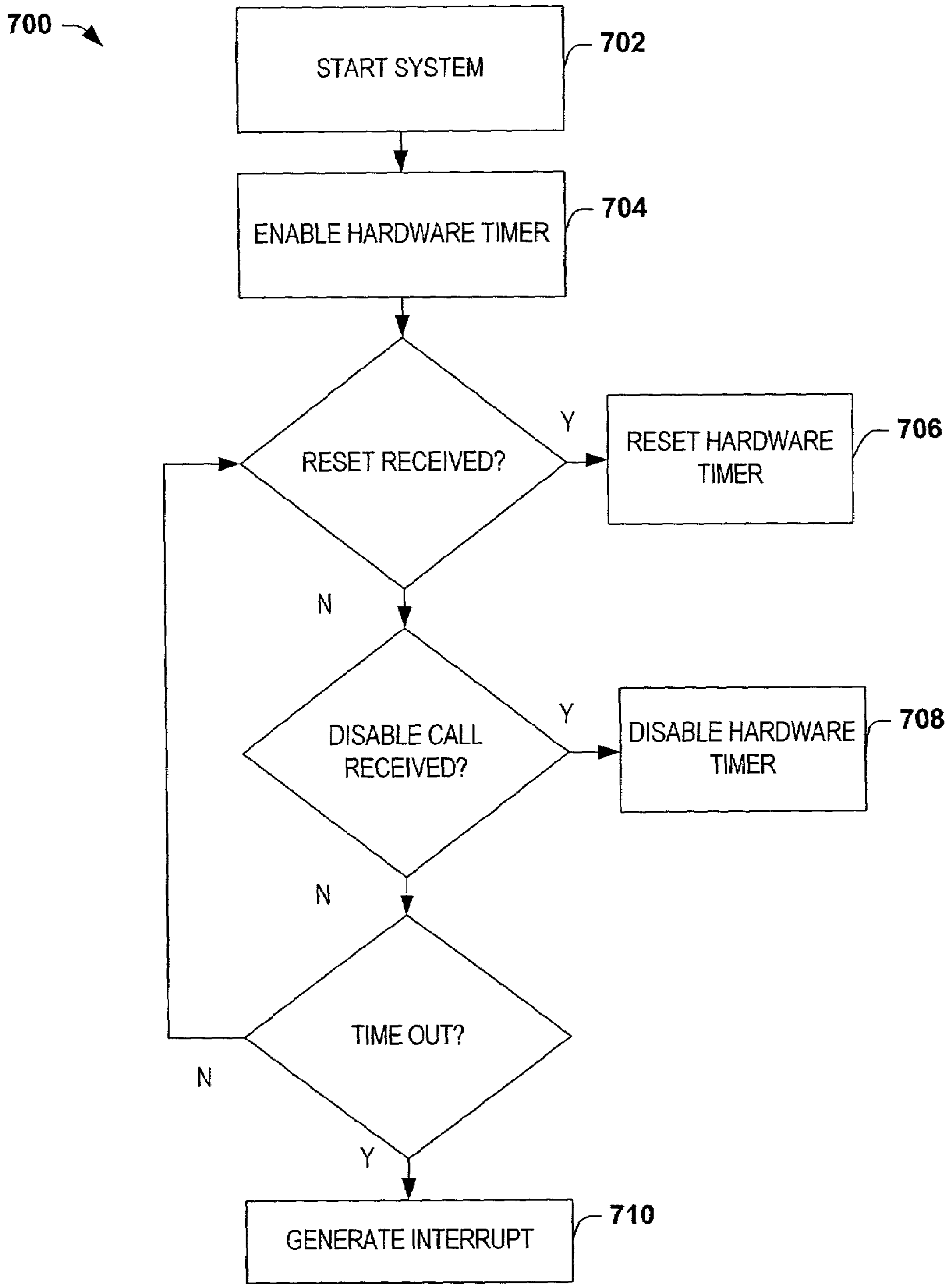
FIG. 7 is a flow diagram of a method of operating a watchdog timer system according to an aspect of the invention.
Figure 8:
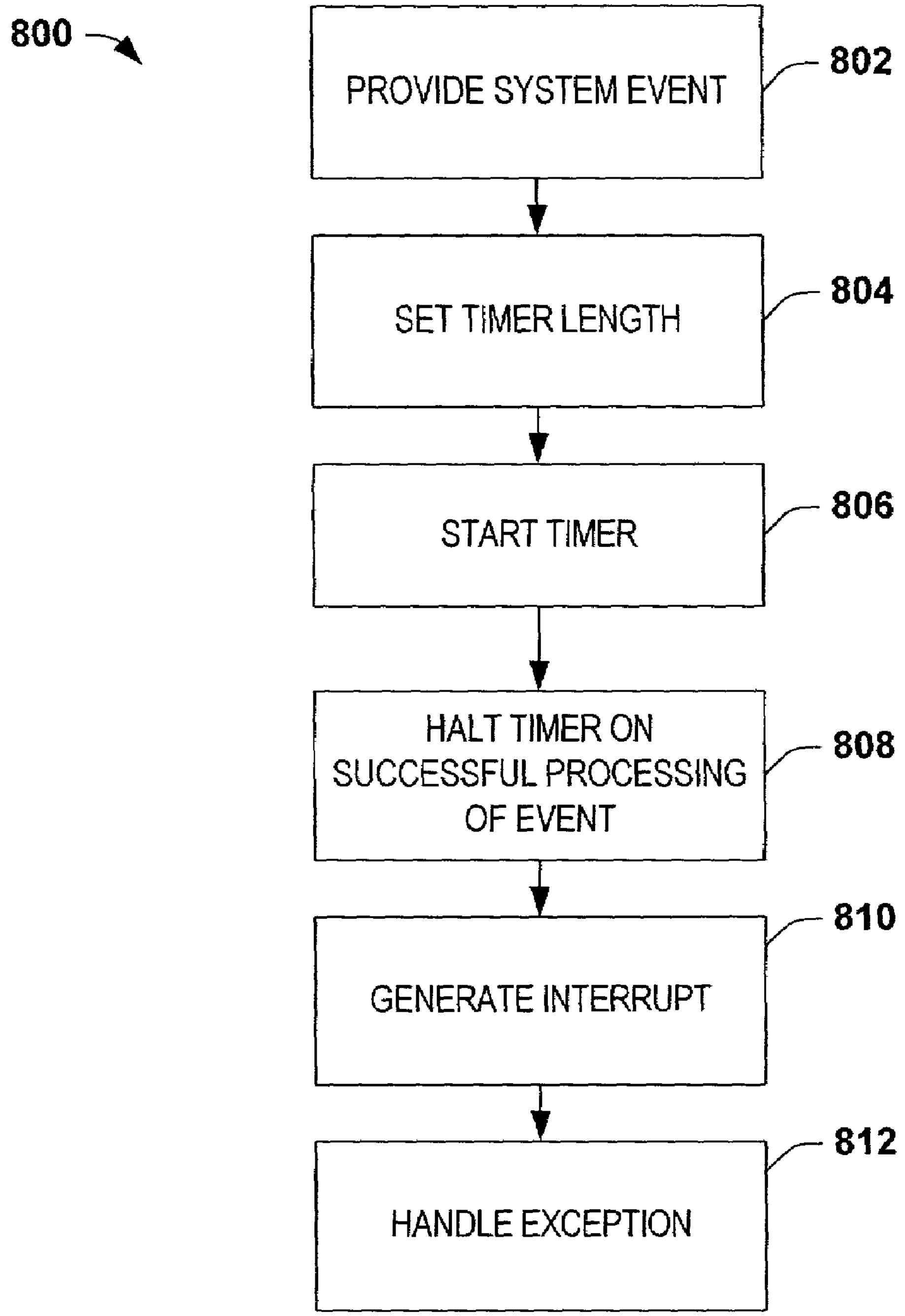
FIG. 8 is a flow diagram of a method of handling errors according to an aspect of the invention.

In view of the foregoing structural and functional features described above, methodologies in accordance with various aspects of the present invention will be better appreciated with reference to FIGS. 6-8. While, for purposes of simplicity of explanation, the methodologies of FIGS. 6-8 is depicted and described as executing serially, it is to be understood and appreciated that the present invention is not limited by the illustrated order, as some aspects could, in accordance with the present invention, occur in different orders and/or concurrently with other aspects from that depicted and described herein. Moreover, not all illustrated features may be required to implement a methodology in accordance with an aspect the present invention.

FIG. 6 is a flow diagram illustrating a method 600 of controlling a hardware based timer according to an aspect of the invention. The method 600 provides watchdog timer functionality. The timer operates as an "up counter", is aperiodic and generally is a 32 or 64 bit counter. However, it is appreciated that a timer acting as a "down counter" can be utilized and still be in accordance with the present invention. Additionally, it is appreciated that other suitable bit sizes (e.g., 128 bits), instead of 32 or 64 bits, and periodic timers can also be utilized and still be in accordance with the present invention. The timer is programmed or controlled via a number of timer parameters including, enable/disable, a compare value, a counter value, a set interrupt and an interrupt enable parameters. The enable/disable parameter and the interrupt enable parameter can be implemented as single bits, respectively. The compare value, the counter value and the set interrupt parameters can be implemented as registers.

The compare value is set at 602 to a desired and/or computed value. The compare value determines the time out value or length of time until an interrupt is generated. The compare value is typically computed as the desired time out value divided by a tick period. The counter value is set or initialized at 604. The counter value is the starting value of the timer and is generally initialized to zero. The set interrupt parameter is set to a desired interrupt at 606. The desired interrupt can determine how a detected error is handled. Optionally, an interrupt type of the timer can be set to determine whether the interrupt to be generated is edge triggered or level triggered. The enable parameter is then set to "true" at 608, which therein enables the hardware timer and starts counting. The counter value is incremented (by one) for every tick period at 610. The tick period is the period of time when the counter value is incremented. Typically, the tick period is less than or equal to about 100 nanoseconds. In alternate aspects of the invention, the tick period is a settable parameter of the timer. Additionally, if the counter value is set to a number greater than the compare value, the counter value wraps around to zero before being incremented to be substantially equal to the compare value. Generally, the smaller the tick period is, the greater the precision of the timer is. On the compare value being equal to the counter value, generating the desired interrupt at 612. On no errors or erroneous events occurring, setting the counter value to zero at 614 prior to the counter value being equal to the compare value. The timer can be disabled by setting the enable/disable parameter to "false" and by optionally setting the interrupt enable parameter to "false".

FIG. 7 is a flow diagram of a method 700 of operating a watchdog timer system according to an aspect of the invention. The method 700 facilitates operation as a watchdog timer by controlling and/or programming a hardware based timer. A call to start the watchdog timer system is received at 702. The call includes a timelength (i.e., desired time out value). The hardware based timer, is enabled at 704. Timer parameters for the hardware based timer are set to starting or initial values and then the timer is enabled. Typically, a compare value is set according to the desired timelength and a counter value is set to zero. Additionally, a desired interrupt can be set to be triggered by the timer. The call is made by a software component operating at least partly in user mode and/or kernel mode based on a event occurring such as loading of a device driver. If a reset signal is received, the timer parameters are reset to starting or initial values at 706. Thus, the timer is disabled, the counter value is reset to zero and the timer is then re-enabled. If a disable call is received, the hardware based timer is disabled at 708. Generally, the hardware based timer is disabled by setting an enable/disable parameter to false. If the timelength expires, an interrupt is generated at 710. Thus, the compare value is now equal to the counter value which causes the timer to generate the interrupt. Based on the interrupt, a CPU stops normal processing and branches to an exception handler. The exception hander is executed and performs suitable error handling and recovery procedures.

FIG. 8 is a flow diagram of a method of detecting and handling errors utilizing a watchdog timer according to an aspect of the invention. A system event to be handled is provided at 802. The system event can be, for example, generating a database, communicating with a network server, performing a system backup and the like. A timer length is set for the system event at 804. The timer length is set according to the type of the system event. For example, performing a system backup can require a longer timer length than logging in to a network server. A watchdog timer system is started according to the time length for the system event at 806. The watchdog timer system includes an application programming interface that controls a hardware based timer such that the system operates as a watchdog timer. The watchdog timer system is halted or stopped on successful processing of the system event at 808. An interrupt is generated by the watchdog timer system on the timer length being elapsed at 810 indicating failure of the system event. The failure of the system event is handled at 812 by an exception handler.

Figure 9:
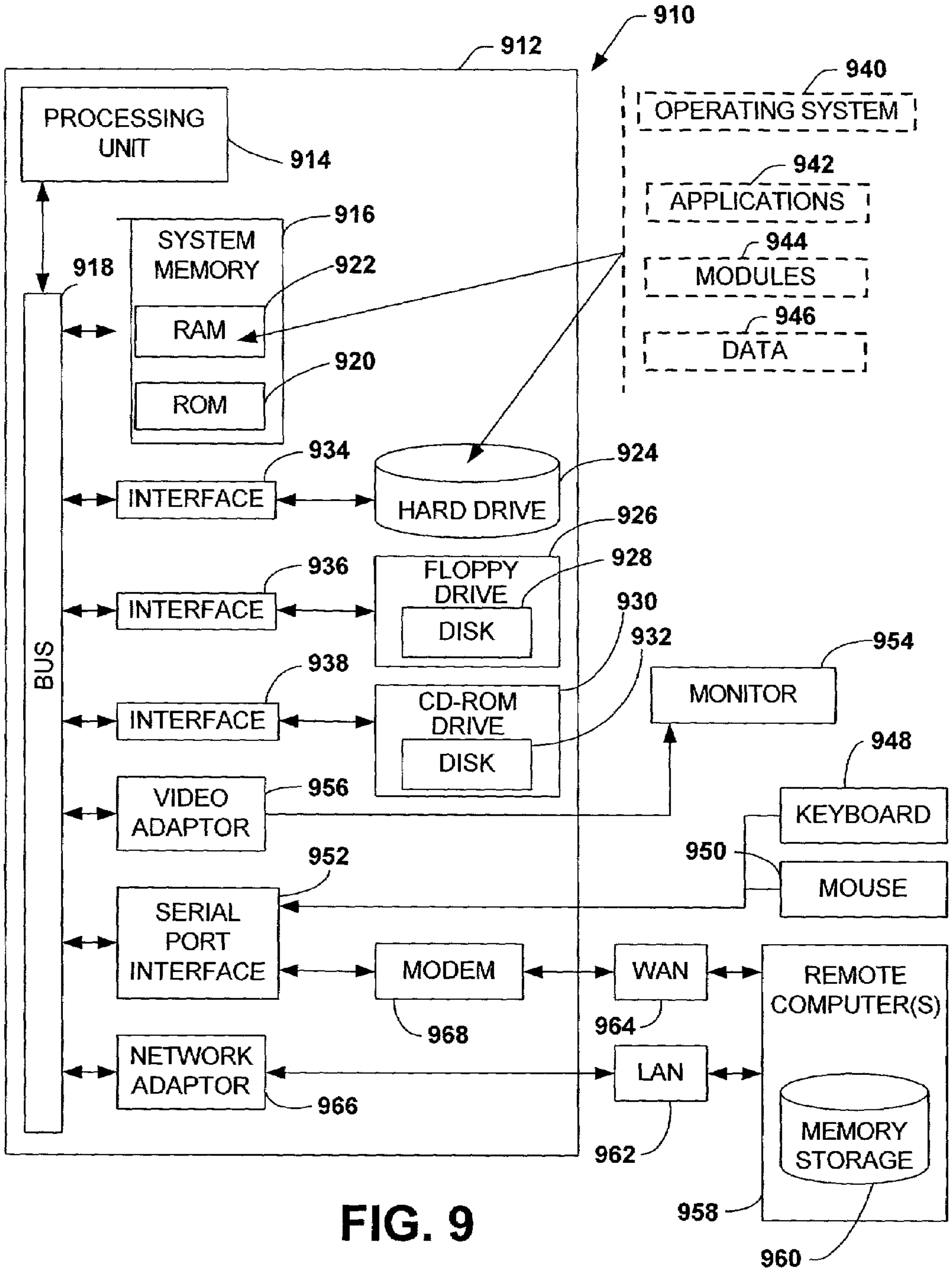
FIG. 9 is a schematic block diagram of an exemplary operating environment for a system configured in accordance with the present invention.

In order to provide additional context for various aspects of the present invention, FIG. 9 and the following discussion are intended to provide a brief, general description of one possible suitable computing environment 910 in which the various aspects of the present invention may be implemented. It is to be appreciated that the computing environment 910 is but one possible computing environment and is not intended to limit the computing environments with which the present invention can be employed. While the invention has been described above in the general context of computer-executable instructions that may run on one or more computers, it is to be recognized that the invention also may be implemented in combination with other program modules and/or as a combination of hardware and software. Generally, program modules include routines, programs, components, data structures, etc. that perform particular tasks or implement particular abstract data types. Moreover, one will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

FIG. 9 illustrates one possible hardware configuration to support the systems and methods described herein. It is to be appreciated that although a standalone architecture is illustrated, that any suitable computing environment can be employed in accordance with the present invention. For example, computing architectures including, but not limited to, stand alone, multiprocessor, distributed, client/server, minicomputer, mainframe, supercomputer, digital and analog can be employed in accordance with the present invention.

With reference to FIG. 9, an exemplary environment 910 for implementing various aspects of the invention includes a computer 912, including a processing unit 914, a system memory 916, and a system bus 918 that couples various system components including the system memory to the processing unit 914. The processing unit 914 may be any of various commercially available processors. Dual microprocessors and other multi-processor architectures also can be used as the processing unit 914.

The system bus 918 may be any of several types of bus structure including a memory bus or memory controller, a peripheral bus, and a local bus using any of a variety of commercially available bus architectures. The computer memory 916 includes read only memory (ROM) 920 and random access memory (RAM) 922. A basic input/output system (BIOS), containing the basic routines that help to transfer information between elements within the computer 912, such as during start-up, is stored in ROM 920.

The computer 912 may further include a hard disk drive 924, a magnetic disk drive 926, e.g., to read from or write to a removable disk 928, and an optical disk drive 930, e.g., for reading a CD-ROM disk 932 or to read from or write to other optical media. The hard disk drive 924, magnetic disk drive 926, and optical disk drive 930 are connected to the system bus 918 by a hard disk drive interface 934, a magnetic disk drive interface 936, and an optical drive interface 938, respectively. The computer 912 typically includes at least some form of computer readable media. Computer readable media can be any available media that can be accessed by the computer 912. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by the computer 912. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

A number of program modules may be stored in the drives and RAM 922, including an operating system 940, one or more application programs 942, other program modules 944, and program non-interrupt data 946. The operating system 940 in the computer 912 can be any of a number of commercially available operating systems.

A user may enter commands and information into the computer 912 through a keyboard 948 and a pointing device, such as a mouse 950. Other input devices (not shown) may include a microphone, an IR remote control, a joystick, a game pad, a satellite dish, a scanner, or the like. These and other input devices are often connected to the processing unit 914 through a serial port interface 952 that is coupled to the system bus 918, but may be connected by other interfaces, such as a parallel port, a game port, a universal serial bus ("USB"), an IR interface, etc. A monitor 954, or other type of display device, is also connected to the system bus 918 via an interface, such as a video adapter 956. In addition to the monitor, a computer typically includes other peripheral output devices (not shown), such as speakers, printers etc.

The computer 912 may operate in a networked environment using logical and/or physical connections to one or more remote computers, such as a remote computer(s) 958. The remote computer(s) 958 may be a workstation, a server computer, a router, a personal computer, microprocessor based entertainment appliance, a peer device or other common network node, and typically includes many or all of the elements described relative to the computer 912, although, for purposes of brevity, only a memory storage device 960 is illustrated. The logical connections depicted include a local area network (LAN) 962 and a wide area network (WAN) 964. Such networking environments are commonplace in offices, enterprise-wide computer networks, intranets and the Internet.

When used in a LAN networking environment, the computer 912 is connected to the local network 962 through a network interface or adapter 966. When used in a WAN networking environment, the computer 912 typically includes a modem 968, or is connected to a communications server on the LAN, or has other means for establishing communications over the WAN 964, such as the Internet. The modem 968, which may be internal or external, is connected to the system bus 918 via the serial port interface 952. In a networked environment, program modules depicted relative to the computer 912, or portions thereof, may be stored in the remote memory storage device 960. It will be appreciated that the network connections shown are exemplary and other means of establishing a communications link between the computers may be used.

Figure 10:
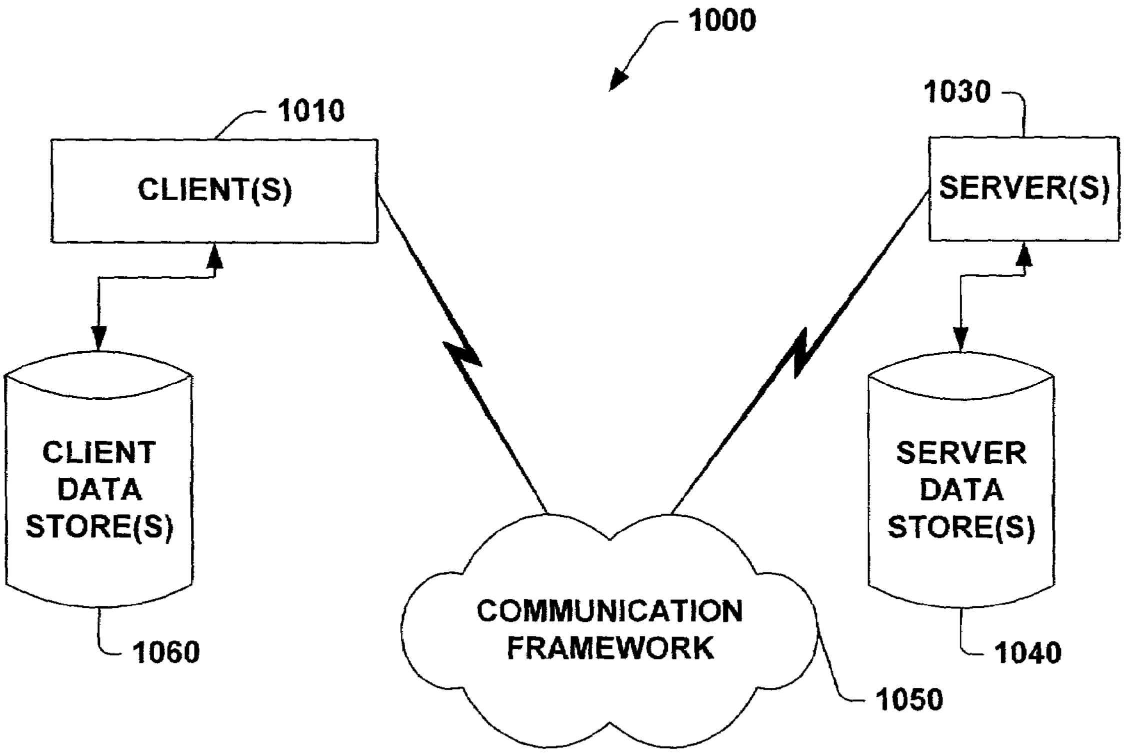
FIG. 10 is a schematic block diagram of a sample-computing environment with which the present invention can interact.

FIG. 10 is a schematic block diagram of a sample-computing environment 1000 with which the present invention can interact. The system 1000 includes one or more client(s) 1010. The client(s) 1010 can be hardware and/or software (e.g., threads, processes, computing devices). The system 1000 also includes one or more server(s) 1030. The server(s) 1030 can also be hardware and/or software (e.g., threads, processes, computing devices). The servers 1030 can house threads to perform transformations by employing the present invention, for example. One possible communication between a client 1010 and a server 1030 may be in the form of a data packet adapted to be transmitted between two or more computer processes. The system 1000 includes a communication framework 1050 that can be employed to facilitate communications between the client(s) 1010 and the server(s) 1030. The client(s) 1010 are operably connected to one or more client data store(s) 1060 that can be employed to store information local to the client(s) 1010. Similarly, the server(s) 1030 are operably connected to one or more server data store(s) 1040 that can be employed to store information local to the servers 1030.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A watchdog timer system comprising:

a hardware timer that one of increments and decrements a counter value toward a compare value every tick period and that generates an interrupt when the compare value equals the counter value; and a watchdog timer programming interface that configures the hardware timer to function as a watchdog timer by:

specifying the compare value to the hardware timer, the watchdog timer programming interface determining the compare value at least in part by computing a ratio of a timelength parameter associated with a system event received from a software application and the tick period;

setting the counter value of the hardware timer to an initial value;

setting the interrupt to a desired interrupt;

enabling the hardware timer to update the counter value every tick period; and resetting the hardware timer upon successful processing of the system event.

2. The system of claim 1, further comprising an exception handler that is executed in response to the interrupt being generated and that performs error recovery procedures.

3. The system of claim 2, the exception handler being a component of an operating system.

4. The system of claim 1, wherein the watchdog timer programming interface resets the hardware timer by resetting the counter value to zero.

5. The system of claim 1, the watchdog timer programming interface enables the hardware timer on receiving a start parameter.

6. The system of claim 1, the hardware timer being a 64 bit timer.

7. The system of claim 1, the hardware timer being a 32 bit timer.

8. The system of claim 1, the hardware timer being an up-counter.

9. The system of claim 1, the hardware timer being a down-counter.

10. The system of claim 1, the watchdog timer programming interface being at least partially implemented in kernel mode.

11. The system of claim 1, wherein the software application calls the watchdog timer programming interface with the timelength parameter for a system event.

12. The system of claim 11, the system event being backing up a computer system.

13. The system of claim 11, the system event being communicating with a network server.

14. The system of claim 11, the software application being a component of an operating system.

15. The system of claim 11, the software application being a hardware abstraction layer.

16. The system of claim 11, the software application operative to call the watchdog timer programming interface with a reset parameter to avoid generation of the interrupt.

17. A method of operating a computing device comprising a hardware timer, the method comprising:

operating the computing device such that the hardware timer is controlled through a software interface programmed to:

set a compare value of the hardware timer to a computed value, the computed value being based on a ratio of a desired time out of a system event to a tick period; and set a counter value of the hardware timer to an initial value.

18. The method of claim 17, wherein the software interface is further programmed to periodically reset the hardware timer prior to an interrupt being generated.

19. The method of claim 18, wherein the software interface is further programmed to reset the hardware timer by disabling the hardware timer, setting the counter value to the initial value and enabling the hardware timer.

20. The method of claim 17, wherein the software interface is further programmed to disable the generalized hardware timer on successful processing of the system event.

21. The method of claim 17, wherein the software interface is further programmed to set an interrupt to be a desired interrupt.

22. The method of claim 17, further comprising executing an exception handler triggered by an interrupt generated by the hardware timer.

23. A method of detecting and handling errors utilizing a watchdog timer, the method comprising:

determining a timelength parameter;

staring a watchdog timer system for a system event according to the timelength parameter, the watchdog timer system having a standard hardware timer configured by a watchdog timer interface, the configuration relates to setting a compare value of the standard hardware timer to a computed value, the computed value being based at least in part on a ratio of the timelength parameter and a tick period of the standard hardware timer;

resetting the watchdog timer system during successful processing of the system event;

halting the watchdog timer system on successful processing to the system event; and generating an interrupt on the timer expiring.

24. The method of claim 23, further comprising handling failure of the system event on the interrupt being generated.

25. A computer-readable storage medium storing computer executable instructions of components operable to perform a method of operating a hardware timer as a watchdog timer, comprising:

a component for setting a compare value of the hardware timer to a computed value, the computed value being based at least in part on a ratio of a timelength parameter defined by a desired time out of a system event and a tick period of the hardware timer;

a component for setting a counter value of the hardware timer to an initial value; and a watchdog timer interface component for configuring the hardware timer to operate as a watchdog timer, a timing mode of the hardware timer configured by the watchdog timer interface.

* * * * *